(12) United States Patent
Spektor et al.

(10) Patent No.: US 11,151,097 B2
(45) Date of Patent: Oct. 19, 2021

(54) DYNAMIC SCHEMA INFERENCE AND ENFORCEMENT

(71) Applicant: Microsoft Technology Licensing, LLC, Redmond, WA (US)

(72) Inventors: Daron Spektor, Seattle, WA (US); Ryan E. Gregg, Seattle, WA (US); Federico Gomez Suarez, Sammamish, WA (US); David G. Porter, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 276 days.

(21) Appl. No.: 15/275,466

(22) Filed: Sep. 25, 2016

(65) Prior Publication Data

US 2018/0089232 A1 Mar. 29, 2018

(51) Int. Cl.
*G06F 16/21* (2019.01)
*G06N 5/02* (2006.01)
*G06N 5/04* (2006.01)

(52) U.S. Cl.
CPC ........... *G06F 16/211* (2019.01); *G06N 5/022* (2013.01); *G06N 5/046* (2013.01)

(58) Field of Classification Search
None
See application file for complete search history.

(56) References Cited

U.S. PATENT DOCUMENTS

| | | |
|---|---|---|
| 7,594,167 B1 * | 9/2009 | Fuchs ................... G06Q 10/06 715/234 |
| 8,244,694 B2 | 8/2012 | Petri |
| 8,819,234 B1 | 8/2014 | Bauer et al. |
| 9,754,048 B1 * | 9/2017 | Probst ..................... G06F 16/86 |
| 2006/0004729 A1 * | 1/2006 | Zhilyaev ............. G06F 17/2247 |
| 2006/0277224 A1 * | 12/2006 | Aftab ................ G06F 17/30575 |
| 2007/0220089 A1 | 9/2007 | Aegerter |
| 2008/0071812 A1 * | 3/2008 | Baby ................... G06F 17/2211 |
| 2013/0019225 A1 | 1/2013 | Peters et al. |

(Continued)

OTHER PUBLICATIONS

Myers, et al., "Introduction to Microsoft Azure Storage", Retrieved on: Sep. 6, 2016 Available at: https://azure.microsoft.com/en-in/documentation/articles/storage-introduction/.

(Continued)

*Primary Examiner* — Hau H Hoang
(74) *Attorney, Agent, or Firm* — NovoTechIP International PLLC

(57) ABSTRACT

Techniques and technologies for dynamic schema determination and enforcement are described. In at least some embodiments, a system comprises: a processing component; and a schema determination and enforcement component configured to receive a first data unit; analyze the first data unit to determine an inferred data schema; receive a second data unit; analyze the second data unit to determine whether the second incoming data unit complies with the inferred data schema; if the second data unit complies with the inferred data schema, write the second data unit to storage; and if the second data unit does not comply with the inferred data schema, at least one of: modify the inferred data schema based on the second data unit; or provide a notification of a non-compliance of the second data unit.

21 Claims, 7 Drawing Sheets

(56) References Cited

U.S. PATENT DOCUMENTS

| | | | |
|---|---|---|---|
| 2014/0067866 A1* | 3/2014 | Chen | G06F 17/3089 |
| | | | 707/791 |
| 2014/0279838 A1* | 9/2014 | Tsirogiannis | G06F 16/211 |
| | | | 707/603 |
| 2015/0088924 A1 | 3/2015 | Abadi et al. | |
| 2015/0121146 A1* | 4/2015 | Mielenhausen | G06F 16/2329 |
| | | | 714/37 |
| 2016/0042015 A1 | 2/2016 | Landau et al. | |
| 2016/0063078 A1 | 3/2016 | Wang et al. | |

OTHER PUBLICATIONS

"Data Model", Published on: Jun. 2, 2016 Available at: http://developer.couchbase.com/documentation/server/current/data-modeling/concepts-data-modeling-intro.html.

"asp.net Dynamic Data Overview", Retrieved on: Sep. 6, 2016 Available at: https://msdn.microsoft.com/en-in/library/cc488546(v=vs.90).aspx.

Purohit, et al., "Verify and convert JSON payloads dynamically for cloud-based applications", Published on: Oct. 2, 2013 Available at: http://www.ibm.com/developerworks/cloud/library/cl-json-verification/.

"Mobile App Backend Services", Retrieved on: Sep. 6, 2016 Available at: https://cloud.google.com/solutions/mobile/mobile-app-backend-services.

\* cited by examiner

```
{
    "name": "autoTag_c4afb531-41b0-482f-b1b7-391bb2cf078a",
    "aliases": [ "oneDriveAutoTag" ],
    "firstUseDate": "datetime",
    "closedToNewProperties": false,
    "isCollection": false,
    "readRestrictedToAppIds": [ ],
    "writeRestrictedToAppIds": [ ],
    "adminRestrictedToUserIds": [ ],
    "version": 3,
    "properties": [
        {
            "name": "propertyName",
            "firstUseDate": "datetime",
            "inferredTypes": [ "int", "bool", "double", "null", "string", "datetime", "object" ],
            "enforcement": "none" | "strict" | "flexible",
            "nullable": false,
            "indexed": false,
            "conversionInstructions": [
                {
                    "ifBeforeVersion": 2,
                    "action": "drop" | "dropNonConforming" | "toString" | "customScript"
                }
            ]
        }
    ]
}
```

Fig. 5

- 610 → • If JSON string
  - o If parses as URI, treat as URI
  - o If parses as ISO8601 DateTime, treat as DateTime
  - o If parses as dashed guid without braces, treat as guid else treat as string.
- 620 → • If JSON object
  - o Throw. Complex types not allowed (in this schema definition).
- 630 → • If JSON array
  - o Throw. Array types not allowed (in this schema definition).
- 640 → • If JSON primitive value
  - o If true or false treat as bool.
  - o If null, treat as nullable unknown.
  - o If parses as Int64, treat as integer.
- 650 → • Compare to byte.Min/MaxValue, int16.Min/MaxValue, int32.Min/MaxValue, and write down the largest range that doesn't work.
  - o If parses as UInt64, treat as UInt64.
  - o If parses as double, treat as double.
  - o Throw. Unsupported number (in this schema definition).
- 660 → • Property name must conform to regex [a-z]+[a-zA-Z0-9]*  (in this schema definition)

Fig. 6

DYNAMIC SCHEMA INFERENCE AND ENFORCEMENT

BACKGROUND

Data storage services receive a wide variety of data from a wide variety of users. Conventionally, the data storage service may receive and store incoming data in any desired data schema, without regard for the consistency or the integrity of the incoming data. Although desirable results have been achieved using conventional data storage systems, there is room for improvement.

SUMMARY

Techniques and technologies for a dynamic schema inference and enforcement are described that may provide considerable advantages over conventional systems.

For example, in at least some implementations, a data storage system, comprises: a processing component operatively coupled to a memory; a schema determination and enforcement component at least partially stored on the memory, the schema determination and enforcement component including one or more instructions executable by the processing component configured to perform one or more operations including at least: receiving a first data unit; analyzing the first data unit to determine an inferred data schema; receiving a second data unit; analyzing the second data unit to determine whether the second incoming data unit complies with the inferred data schema; if the second data unit complies with the inferred data schema, writing the second data unit to storage; and if the second data unit does not comply with the inferred data schema, at least one of: modifying the inferred data schema based on the second data unit; or providing a notification of a non-compliance of the second data unit.

In addition, in at least some implementations, a data storage system, comprises: circuitry configured for receiving a first data unit; circuitry configured for analyzing the first data unit to determine an inferred data schema; circuitry configured for receiving a second data unit; circuitry configured for analyzing the second data unit to determine whether the second incoming data unit complies with the inferred data schema; circuitry configured for writing the second data unit to storage if the second data unit complies with the inferred data schema; and circuitry configured for, if the second data unit does not comply with the inferred data schema, at least one of: modifying the inferred data schema based on the second data unit; or providing a notification of a non-compliance of the second data unit.

Furthermore, in at least some implementations, a method for data storage at least partially implemented using one or more processing components, comprises: receiving an incoming data for storage on a storage device; analyzing the incoming data using at least one inference algorithm operating on the one or more processing components to determine an inferred data schema; receiving additional incoming data for storage on the storage device; analyzing the additional incoming data to determine whether the additional incoming data substantially complies with the inferred data schema; if the additional incoming data substantially complies with the inferred data schema, writing the additional incoming data to the storage device; and if the additional incoming data does not substantially comply with the inferred data schema, modifying the inferred data schema based on one or more detected differences between the additional incoming data and the inferred data schema.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the use of the same reference numbers in different figures indicates similar or identical components.

FIG. 5 shows an embodiment of an inferred schema definition.

FIG. 6 shows an embodiment of a property inference algorithm.

DETAILED DESCRIPTION

Figure 1:
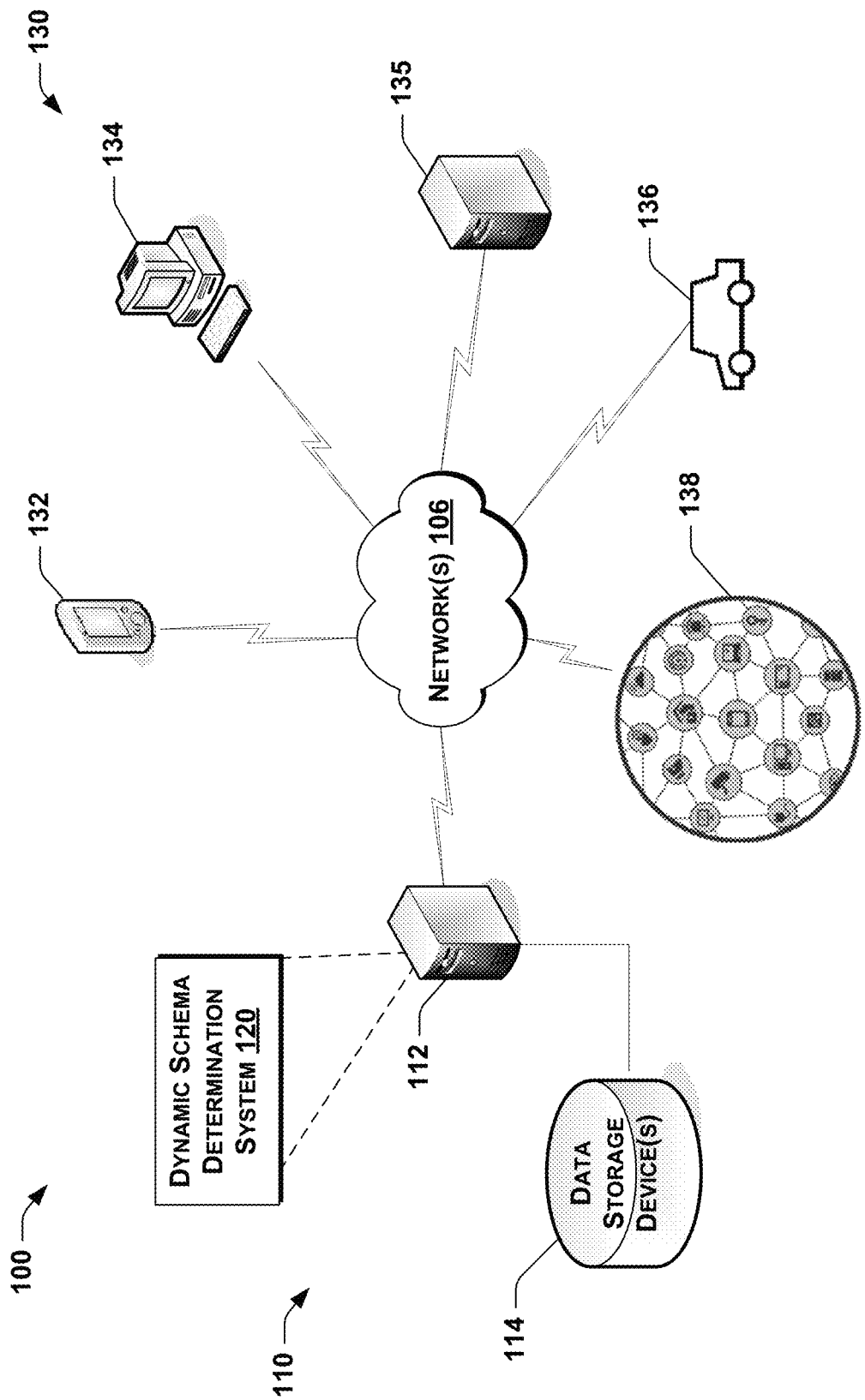
FIG. 1 shows an embodiment of an environment for dynamic schema inference and enforcement.

The present disclosure describes techniques and technologies for dynamic schema inference and enforcement. As described more fully below, dynamic schema inference and enforcement in accordance with the present disclosure may advantageously allow a data-storage service to automatically analyze custom data sent to the storage service by users (e.g. application developers, institutions, etc.), determine and store statistics about this data, and perform validation on future incoming data based on learnings from the previously-received data.

Typically, users that store data, such as application developers, may wish to store custom data in accordance with their own needs into a data storage service. One possible approach by the data storage service is to treat the incoming data as opaque, and perform no analysis of the incoming data prior to storage. The user (e.g. application developer, business entity, etc.) transmits the data in any desired schema for storage, and is responsible for maintaining and implementing any constraints, validations, or other requirements (e.g. business logic, etc.) that maintain and ensure the integrity of the stored data. Such an approach may be relatively friendly to the user because of its low friction, but may ultimately lead to inconsistent or problematic data, or extra work on the developer's side to prevent inconsistent or problematic data from occurring. In addition, this approach may result in an inability for other applications (other than the transmitting application) to safely interact with the stored data.

Another approach that a data storage service may follow is to require a user to explicitly pre-define (or pre-register) a data storage schema prior to transmitting any data for storage. This approach has the advantage of enabling the data storage service to perform validation, analysis, processing, or optimization of the incoming data (e.g. indexing, etc.) as a service to the user, however, such an approach results in additional friction and delay due to the requirement for the user to pre-register everything they do. Such a requirement may be particularly disadvantageous for certain users (e.g. application developers) whose customized data storage requirements may evolve relatively rapidly and frequently.

Accordingly, in at least some implementations, techniques and technologies for dynamic schema inference and enforcement may advantageously offer users the flexibility of storing whatever data the user desires on the fly, while also providing type-safety and constraint validation. More specifically, in at least some implementations, a dynamic schema determination system receives any custom data the user provides, except that instead of treating the incoming data as opaque (or non-analyzable), the system analyzes and reasons over the incoming data, infers its shape (or schema), and generates and stores statistics about what it determined (e.g. "the 'age' property is a number and the 'name' property is a string). As new incoming data is received having new properties and values added over time, the system may refine its inferences (e.g. "the 'age' property can include a decimal number too, not just a whole number"; "there is now also a 'school' property, which is a string, but it is not set in all cases."). Based on an inferred data schema resulting from analyses of previous incoming data, the dynamic schema determination system can automatically perform validation and enforcement on newly transmitted data (e.g. "error, the 'age' has been inferred to be a number based on previous data, so the current input of type "string" is likely invalid"). In at least some implementations, the user may access the determined data schema to modify existing constraints or to apply additional constraints (e.g. "age must be a number greater than 0 or less than 150, and 'name' must be a string of max length 50, and is always required").

FIG. 1 shows an embodiment of an environment 100 for dynamic schema inference and enforcement in accordance with the present disclosure. In this embodiment, the environment 100 includes a data storage system 110 that includes a computing device 112 (e.g. a server) configured to receive incoming data via one or more networks 106 from one or more user devices 130, and to store the incoming data onto one or more data storage devices 114.

The computing device 112 of the data storage system 110 includes a data schema determination system 120 in accordance with the present disclosure. In at least some implementations, the dynamic schema determination system 120 may be configured to analyze incoming data sent to the storage service by the user devices 130, determine and store statistics about the incoming data, and perform validation on future incoming data based on inferences from the previously-received data, as described more fully below. It will be appreciated that the data storage system 110 is depicted in FIG. 1 in a simplified schematic form for ease of understanding, and that in alternate embodiments, a data storage system in accordance with the present disclosure may be scaled up substantially in size to include numerous computing devices (e.g. tens, hundreds, thousands, etc.) that receive incoming data from numerous user devices (e.g. thousands, millions, etc.), and that analyze and store the incoming data on numerous data storage devices (e.g. hundreds, thousands, etc.).

In the embodiment shown in FIG. 1, the user devices 130 include a mobile device 132. It will be appreciated that the mobile device 132 shown in FIG. 1 may represent a variety of possible device types, including but not limited to a handheld device, such as a cellular telephone, a Personal Data Assistant (PDA), a notebook computer, a tablet computer, a slate computer, a laptop computer, a smart watch, or any other handheld device. The user devices 130 further include a desktop computing device 134, a mainframe (or server) device 135, a vehicle 136 (e.g. automobiles, robotic vehicles, aircraft, watercraft, trains, subways, etc.), and, more generally, an Internet of Things 138 (e.g. sensors, wearable articles, appliances, buildings, infrastructure components, etc.).

Figure 2:
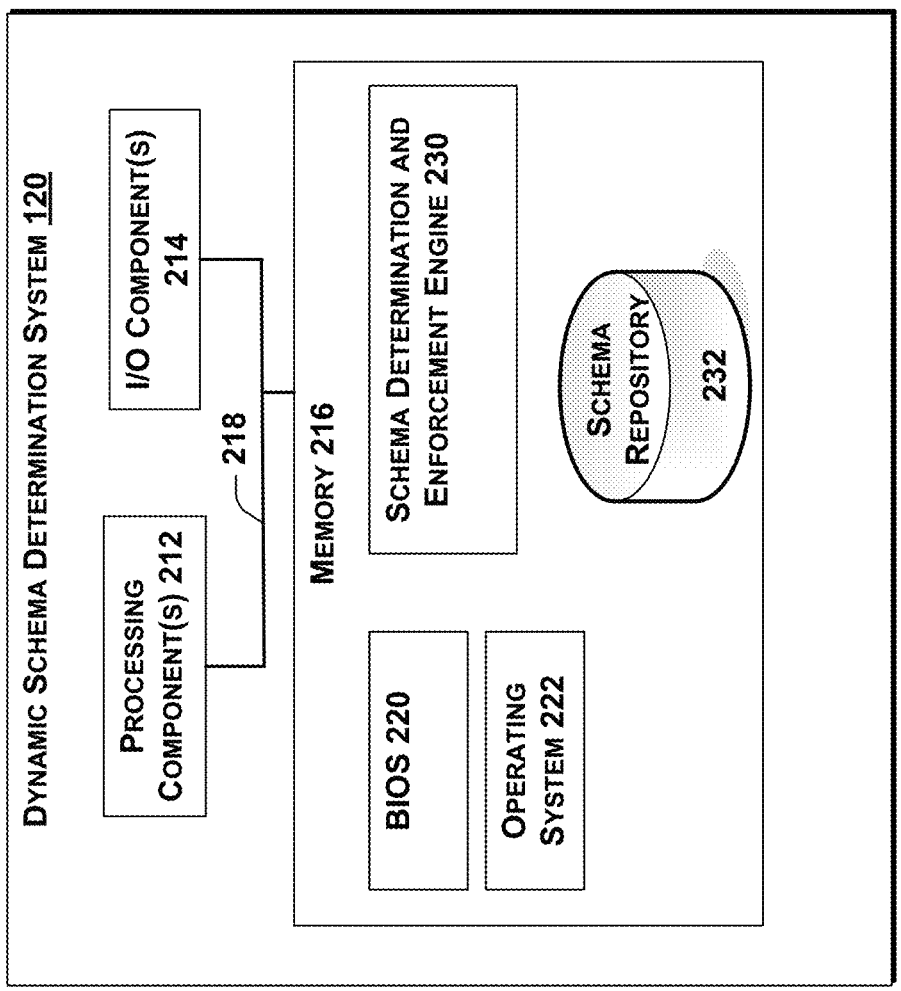
FIG. 2 shows an embodiment of a dynamic schema determination system of FIG. 1.

FIG. 2 shows an embodiment of the dynamic schema determination system 120 of FIG. 1. In this embodiment, the dynamic schema determination system 120 includes one or more processing components 212 and one or more input/output (I/O) components 214 coupled to a memory 216 by a bus 218. The memory 216 includes a basic input/output system (BIOS) 220 that provides basic routines, including facilitating the transfer information between elements within the system 120, and an operating system 222 that manages and provides common services to the various elements of the system 120.

As further shown in FIG. 2, a schema determination and enforcement engine 230 and a schema repository 232 are stored within the memory 216. The schema determination and enforcement engine 230 is configured to perform one or more operations as described herein for dynamic schema inference and enforcement. The schema repository 232 serves to store the one or more schema definitions that are determined by the schema determination and enforcement engine 230. It will be appreciated that, in at least some implementations, a schema repository in accordance with the present disclosure may be shared across multiple data storage systems (e.g. system 110 and others), and therefore, the schema repository 232 may be located on a separate device that operatively communicates (e.g. via a network) with the computing device 112. In addition, it will be appreciated that it may not be necessary to store an entire schema repository with the memory 216 of the dynamic schema determination and enforcement system 120, but rather, in at least some implementations, just the data from within the repository needed to perform a particular schema validation on a given set of incoming client data at any point in time. For example, in at least some implementations, an entire schema definition for a particular set of incoming data is typically in memory, but not the entire schema repository 232. In further implementations, even a single schema definition may be too large to maintain in the memory 216 at one time, and in such implementations, it may be possible that only portions of a schema definition may be practically stored in the memory 216 at any given time.

In addition, in at least some implementations, the schema determination and enforcement engine 230 may include executable instructions that, when executed by the one or more processing components 212, perform one or more operations for dynamic schema inference and enforcement in accordance with the present disclosure. More specifically, in at least some implementations, the schema determination and enforcement engine 230 may be (or may include) an Application Programming Interface (API). It will be appreciated that in alternate implementations, a schema determination and enforcement engine 230 may be at least partially implemented using special purpose circuitry, such as using Application Specific Integrated Circuits (ASICs), Field Programmable Gate Arrays (FPGAs), or other suitable circuitry or components. In at least some implementations, when the one or more processing components 212 are executing the executable instructions of the schema determination and enforcement engine 230, then the one or more processing components 212 become circuitry configured for performing one or more operations for dynamic schema inference and enforcement in accordance with the present disclosure, as described more fully below.

In at least some implementations, only a designated "owning" entity (e.g. owning application, owning user, etc.) may allow the schema definition to be altered (e.g. make any changes that update or modify the inferences that define the schema definition). Alternately, in at least some implementations, additional entities (e.g. developers, user accounts, etc.) associated with an owning entity may also be authorized to modify a schema definition, such as to update existing extensions or instantiate new ones (e.g. on condition that such new modifications conform to schema patterns previously seen or used by the owning entity). In at least some implementations, the owning entity may choose to control which applications are allowed to read, write, and modify a schema definition. Similarly, in at least some implementations, the owning entity may declare a schema as closed to new properties to prevent future changes by the schema determination and enforcement engine 230 (e.g. based on new inferences). For example, in some implementations, the following rules may be assigned to a schema definition by default: read=all, write=all-that-match-inference, modify=owner-only.

In at least some implementations, the owning entity (e.g. owning user, owning application, etc.) may call the schema determination and enforcement engine 230 to modify, adjust, or configure a schema definition that applies to the incoming data of that owning entity. For example, in at least some implementations, the owning entity may provide a name for the schema (e.g. "onedrive.autoTag," etc.). The schema determination and enforcement engine 230 may change the name of the schema definition as specified by the owning entity, or alternately, may add the new name as an alias, and allow one or more previous names for the schema definition to continue to work to identify the schema. In addition, in at least some implementations, an owning entity may declare a property as having a certain type (or types), and the schema determination and enforcement engine 230 may enforce future writes to this property to conform to the indicated type (or types). If the property has not been encountered before, then in at least some implementations, the schema determination and enforcement engine 230 may allow the operation as specified by the owning entity. Alternately, in at least some implementations, if the property type specified by the owning entity conflicts with what has been seen before, the schema determination and enforcement engine 230 may return an error message to the owning entity to indicate this circumstance, and may also provide an indication of the property types that have been previously encountered during the storage of previous incoming data.

In at least some implementations, the owning entity may declare a property as being "required" in all incoming data units (e.g. JSON blob, blocks, packets, or other suitable units). The schema determination and enforcement engine 230 may determine whether the property has never been seen before in any previously incoming data associated with the particular schema, and if not, the operation may be allowed and future writes will require the property to be set. Alternately, if the property has been seen before, the operation may be allowed only if the property was specified on every previous instance of incoming data the schema determination and enforcement engine 230 has seen.

In at least some implementations, the owning entity may declare a property as "indexed," and the schema determination and enforcement engine 230 may perform indexing if conditions are met. For example, in at least some implementations, the schema determination and enforcement engine 230 may index a property if a workload on a data storage device associated with the schema determination and enforcement engine 230 is available to support such indexing. In addition, if the property has never been seen before, then indexing by the schema determination and enforcement engine 230 may be enabled so that all future writes of the property are indexed. If the property has been seen before, however, in at least some implementations, the schema determination and enforcement engine 230 may decline to perform indexing (e.g. the amount of previously-stored data is overly large), or may conditionally perform indexing (e.g. the owning user requests the indexing and the indexing may be performed in background computing over a sufficient period of time).

Figure 3:
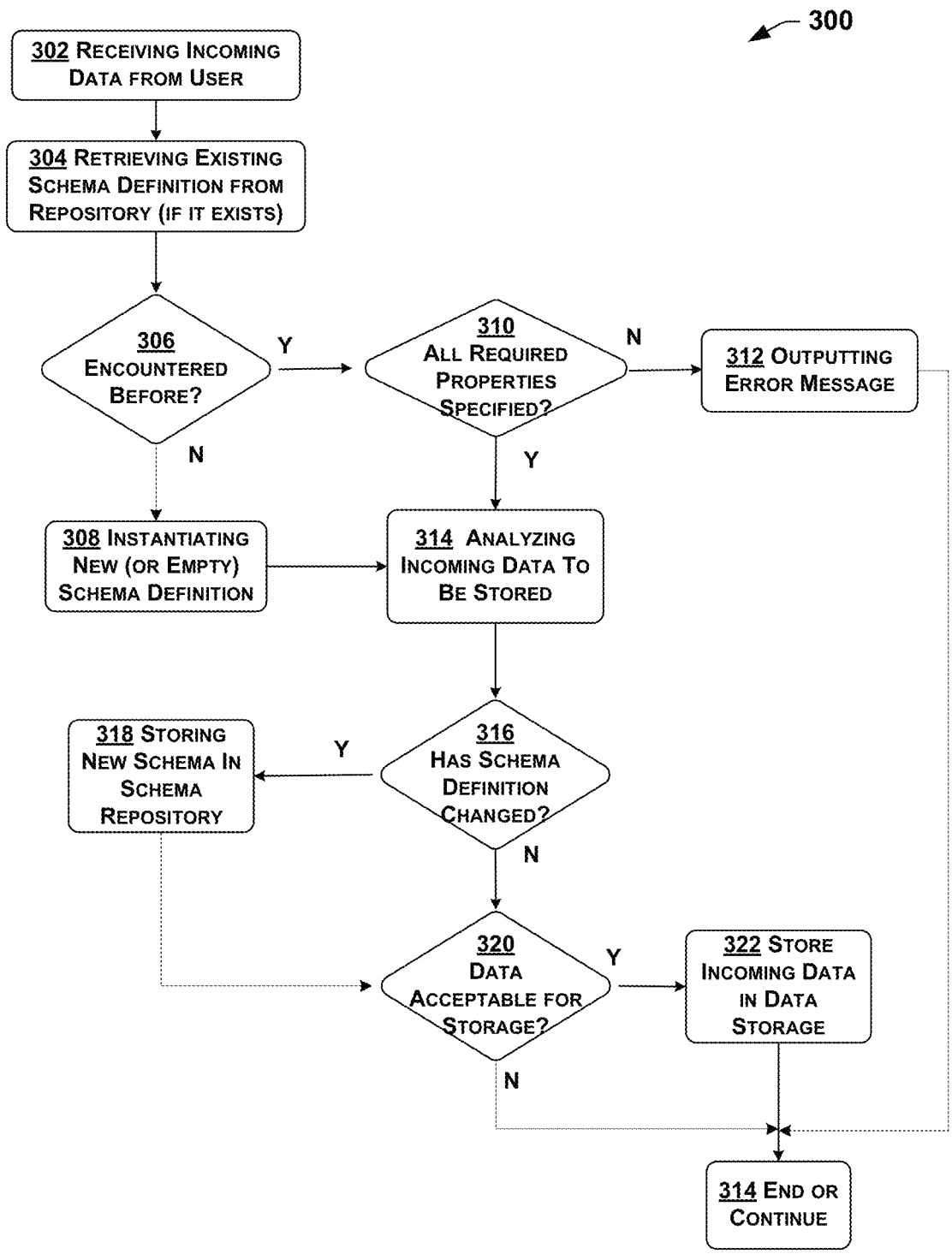
FIG. 3 shows an embodiment of a dynamic schema determination process.

FIG. 3 shows an embodiment of a dynamic schema determination process 300. In this embodiment, the dynamic schema determination process 300 is described from the perspective of a data processing system (e.g. data processing system 110 of FIG. 1), or alternately, from the perspective of a dynamic schema determination system (e.g. system 120 of FIGS. 1-2). More specifically, the process 300 includes receiving incoming data from a user at 302. At 304, the process 300 includes retrieving an existing schema definition from a repository if it exists. For example, in at least some implementations, the process 300 may receive an indication of the schema from a source of the incoming data (received at 302) (e.g. identifying information for a particular user, user device, application, or other identifying indicia), and may search a schema repository for a corresponding schema that the incoming data is anticipated to comply with in accordance with the indication of the source of the incoming data. More specifically, a user may explicitly name a schema user which they wish to store data, e.g.:

{
"name": "photo.jpg"
"datecreated": "2016"
"one drive. autotag": {
"detectedObject": "dog"
"confidence": 0.97
}
}

In this example, the user is attempting to store data conforming to a "onedrive. autotag" schema.

Next, the process 300 determines whether an actual schema of the incoming data has been encountered before at 306. For example, in at least some implementations, the process 300 may analyze one or more portions (e.g. JSON blob, blocks, packets, etc.) of the incoming data (received at 302) and compare the results of the analysis with one or more existing schemata (e.g. retrieved at 304 or otherwise obtained) to assess whether the actual schema of the incoming data has been previously encountered by the dynamic schema determination system (at 306). For example, in at least some implementations, the computing device 112 of the data storage system 110 may attempt to look up a schema definition corresponding to the incoming data in the schema repository 232.

As further shown in FIG. 3, if it is determined (at 306) that the actual data schema of the incoming data has not been encountered before, then the process 300 proceeds to instantiating a new (or empty) schema definition at 308. In at least some implementations, the computing device 112 of the data storage system 110 will generate and develop the new schema definition "on the fly" through analysis of the incoming data in one or more subsequent operations, as described more fully below.

More specifically, in at least some implementations, the instantiating the new schema definition (at 308) may include instantiating a new schema definition that follows a pattern as follows: {schemaName}_{appId}. Of course, in alternate implementations, any suitable naming format may be employed. In at least some implementations, when the computing device 112 of the data storage system 110 attempts to look up the registered schema definition (at 306) but is unsuccessful, and if the data value being analyzed is an array, the schema may be registered as a collection-type of data, otherwise it may be registered as a single-object type.

On the other hand, if it is determined (at 306) that the actual data schema of the incoming data has been encountered before, then the process 300 proceeds to determining whether all required properties of the data schema are specified at 310. For example, in at least some implementations, the determining whether all required properties of the data schema are specified (at 310) may refer to the union of incoming data as well as previously-stored data for a particular instantiation of the schema. For example, assume a particular embodiment of a schema called "Animal" which requires a "Birthday" property and a "Name" property. If a user attempts to update a "Color" property, which is optional, in at least some implementations, an incoming data may only contain the "Color" parameter, but the previously-encountered schema definition says that the "Birthday" and "Name" properties are required. In such an implementation, if a system performed the determination (at 310) against only the new incoming data (i.e the "Color" property) it would fail because the two required properties "Birthday" and "Name" may be missing. Thus, in at least some implementations, the determination (at 310) 310 may involve pulling in the previously-stored data (which includes "Birthday" and "Name" properties), and perform the validation (or determination) at 310 against the union of the incoming data as well as the previously-stored data.

If it is determined (at 310) that all required properties of the data schema are not specified, then the process 300 proceeds to outputting an error message at 312, and then the process 300 ends or continues to other operations at 314. In at least some implementations, the error message (output at 312) may be a message visible to the user (e.g. at the user device), or alternately, may be a computer-only error code (e.g. 28397532), or both.

As further shown in FIG. 3, if it is determined (at 310) that all required properties of the data schema are indeed satisfied, then the process 300 proceeds to analyzing incoming data to be stored at 314. It will be appreciated that a variety of operations and analysis techniques may be employed during the analysis of the incoming data (at 314). Various implementations and embodiments of operations and analysis techniques which may be performed on the incoming data (at 314) are described more fully below (e.g. see FIG. 4 and accompanying description).

After the incoming data are analyzed (at 314), the process 300 further includes determining whether the schema definition has changed at 316. If it is determined that the schema definition has changed (at 316), then the process 300 proceeds to storing the new schema in the schema repository at 318.

If it is determined (at 316) that the schema definition has not changed, or after storing the new schema in the schema repository (at 318), the process 300 proceeds to determining whether the data is acceptable for storage at 320. For example, in at least some implementations, the process 300 may determine (at 320) that the incoming data is acceptable for storage based on whether any errors (or an acceptable number of errors) were encountered during the analyzing of the incoming data (at 314). Alternately, in at least some implementations, which may be more typical or likely implementations, the process 300 may verify that the data is acceptable for storage (at 320) before updating the schema (at 318) to avoid the risk that an erroneous update attempt containing invalid input would broaden the schema definition needlessly or undesirably.

Returning again to FIG. 3, if it is determined (at 320) that the incoming data is not acceptable for storage, then the process 300 ends or continues to other operations at 314. Alternately, if it is determined (at 320 that the incoming data is acceptable for storage, then the process 300 includes storing the incoming data in a data storage at 322, and then the process 300 ends or continues to other operations at 314.

Figure 4:
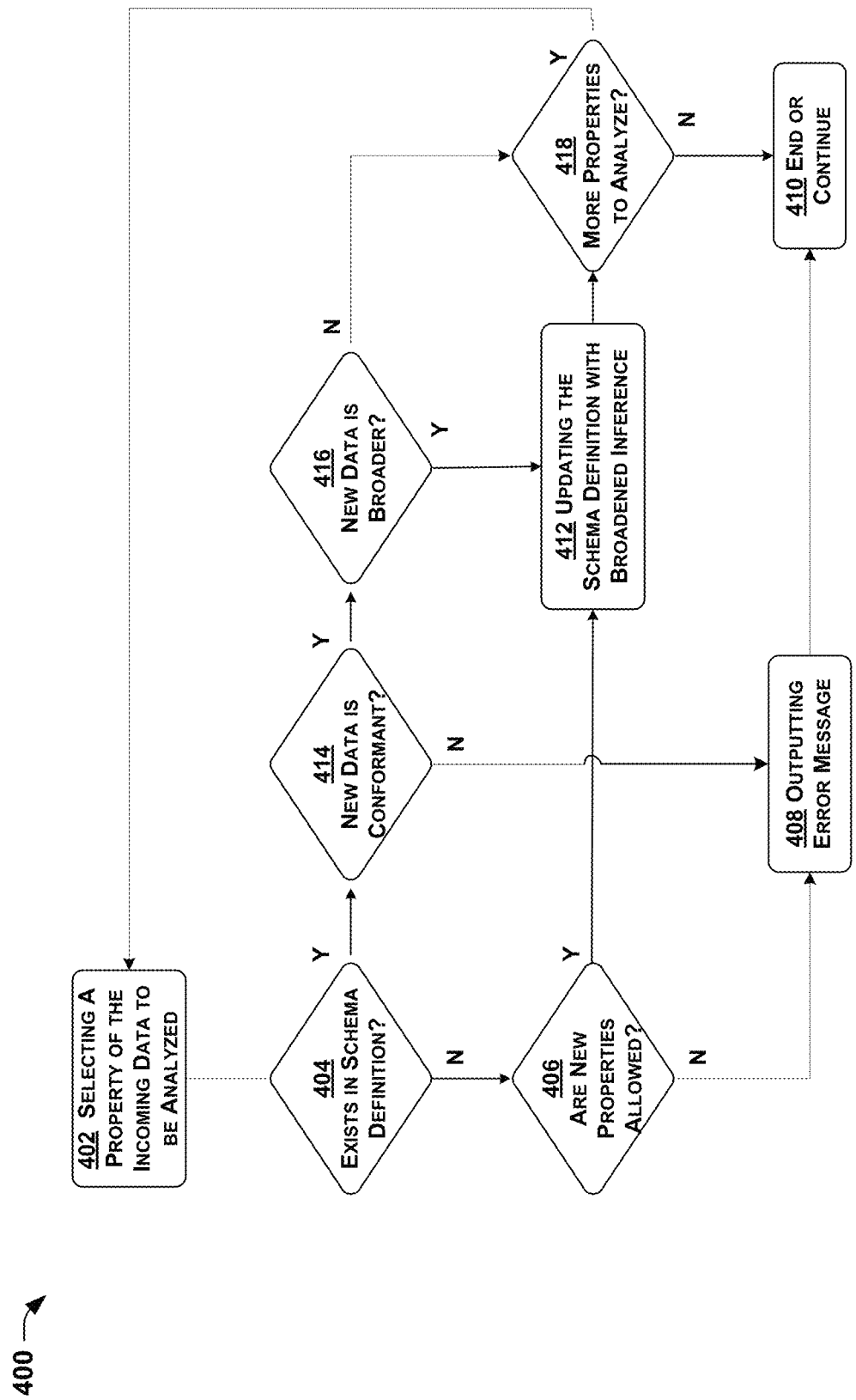
FIG. 4 shows an embodiment of a data analysis process.

FIG. 4 shows an embodiment of a data analysis process 400. The data analysis process 400 is a representative example of a process that may be performed during the analyzing of the incoming data (at 314) of the dynamic schema determination process 300 of FIG. 3. Specifically, in this embodiment, the data analysis process 400 includes selecting a property of the incoming data to be analyzed at 402. At 404, the process 400 determines whether the property exists in the schema definition.

If it is determined (at 404) that the property does not exist in the schema definition, then the process 400 determines whether new properties are allowed by the schema definition at 406 (e.g. as designated by the owning entity). If new properties are not allowed by the schema definition (at 406), then the process 400 includes outputting another instance of an error message at 408 (e.g. that a new property has been encountered and the schema definition does not permit new properties), and then ends or continues to other operations at 410. Alternately, if it is determined (at 406) that the schema definition allows new properties, the process 400 proceeds to updating the schema definition with a broadened inference at 412. For example, in at least some implementations, the computing device 112 of the data storage system 110 may observe one or more of the JSON (JavaScript Object Notation) properties of the incoming data intended to be written, infers their types, and records the inferences in the new schema definition. Although JSON is a well-known format that uses human-readable text to transmit data objects consisting of attribute-value pairs, in alternate implementations, the computing device 112 may observe one or more properties of any other suitable format used to transmit data objects.

Returning again to the determination at 404, if it is determined that the property does exist in the schema definition, the process 400 determines whether the new data is conformant with the schema definition at 414. For example, in at least some implementations, the computing device 112 of the data storage system 110 may analyze the incoming data and enforce any constraints associated with a schema definition (e.g. constraints inferred from previous incoming data, registered by a user, etc.). In at least some implementations, such as for a newly encountered schema, there may be no constraints to enforce as the data is initially incoming, prior to development of a new schema definition. In addition, in at least some implementations, the computing device 112 of the data storage system 110 may perform a basic sanity check enforcement of the incoming data to avoid basic, relatively obvious errors, such as to avoid crossing types (e.g. attempting integer into string property, attempting Boolean value into number property, etc.).

If it is determined (at 414) that the new data is not conformant with the schema definition, then in at least some implementations, the process 400 proceeds to outputting an error message at 408 (e.g. that a new data is not conformant with the schema definition), and then ends or continues to other operations at 410. Alternately, such as if the schema definition is a new schema definition that is being generated "on the fly," the process may alternately allow the value that is of a different type than anticipated (or previously noted), and may adjust a schema inference to reflect that both types of data were encountered and to allow for the possibility of both types unless otherwise instructed, in which case the outputting (at 408) may simply indicate that an unexpected type (or unexpected value) of data was encountered.

As further shown in FIG. 4, if it is determined (at 414) that the new data is conformant with the schema definition, then the process 400 proceeds to determining whether the new data is broader than the schema definition at 416. For example, if the schema definition specifies that a property is "integer" but incoming data is a whole number (e.g. "floating point"), then the new data may be considered broader. If the process 400 determines (at 416) that the new data is broader than the schema definition, then the process 400 proceeds to updating the schema definition with the broadened inference (at 412).

Alternately, if it is determined that the new data is not broader than the schema definition (at 416), or after updating the schema definition with the broadened inference (at 412), then the process 400 proceeds to determining whether there are any more properties of the incoming data to analyze at 418. If it is determined (at 418) that there are more properties to analyze, then the process 400 returns to selecting another property of the incoming data to be analyzed (at 402), and at least some of the above-described operations are repeated until it is determined that there are no more properties to analyze. Once it is determined (at 418) that there are no more properties to analyze, then the process 400 ends or continues to other operations at 410.

As noted above, in at least some implementations, a data storage system (e.g. more specifically, the determination and enforcement engine 230) analyzes incoming data and performs dynamic schema inference and enforcement. For performing dynamic schema inference, the determination and enforcement engine 230 may apply one or more inference rules, as described more fully below. For example, in at least some implementations, the determination and enforcement engine 230 may de-serialize and interrogate a data unit (e.g. a JSON blob, block, packet, etc.) on a write of the data to storage, and may compare each property to a cached schema definition. If a mismatch is determined, in at least some implementations, the schema determination and enforcement engine 230 may force refresh the schema definition from the primary source (e.g. the schema repository), but if there is still a mismatch, the schema determination and enforcement engine 230 may check what the conflict is, and if the conflict is incompatible (e.g. string=integer), the schema determination and enforcement engine 230 may throw (e.g. provide an output message and not write the erroneous data unit). Alternately, in at least some implementations, if the conflict is compatible (e.g. integer→double), the schema determination and enforcement engine 230 may update the schema definition with the new learnings. In at least some implementations, the schema determination and enforcement engine 230 may continue with the write of the particular data unit only after the data unit has been successfully analyzed.

In at least some implementations, a user may interact manually with the schema determination and enforcement engine 230 to "administer" the user's data stored by the data storage system 110. For example, if a user is attempting to manually make a change that conflicts with existing data (or an existing schema definition) (e.g. changing a "version" property from a string to an integer), then the schema determination and enforcement engine 230 may respond in various ways. For example, in at least some implementations, the schema determination and enforcement engine 230 may notify the user of the conflict, and may require the user to manually "reset" the property and invalidate all the associated historical data or any data that doesn't match the new format. Alternately, in at least some implementations the schema determination and enforcement engine 230 may perform a conversion of the historical data to the new property definition (e.g. perform a "ToString" operation on all historical data if the desired new format is a string). Alternately, in at least some implementations, the schema determination and enforcement engine 230 or another suitable component of the data storage system may implement a specifically tailored conversion function (e.g. Javascript function, etc.) to convert the historical data to the new definition. In at least some implementations, however, the specifically tailored conversion function may be developed and implemented manually by the user or other suitable administrator of the data storage system 110.

In at least some implementations, the data storage system may implement changes to a schema definition by maintaining a "version" counter on the schema definition, and an optional set of conversion instructions indicating how to bring previously-stored values into compliance with new schema versions (e.g. "oldVersionTranslators" collection). In at least some implementations, for example, such instructions may include general operations such at "ToString" or "Delete," or specifically-tailored conversion functions, or any other transformation method. On each data instance that is stored, the data storage system may also record the schema version the data was written with. If the data storage system reads data that was written using an older (or non-current) schema definition, and the changed property has any conversion instructions (e.g. "oldVersionTranslators") specified, the data storage system may loop through the specified conversion instructions and run each applicable one.

Performance of at least some of the above-noted operations and processes by the schema determination and enforcement engine 230 may advantageously result in an inferred schema definition. FIG. 5 shows an embodiment of an inferred schema definition 500. In this embodiment, the inferred schema definition 500 includes a name 502, one or more aliases 504, a first use date 506, a "closed to new properties" parameter 508, an "is collection" parameter 510 (which may indicate whether the schema is used for a multi-value collection (eg. a list of tags), or a single value (eg. a serial number); possible alternative names for this property could be "IsMultiValue" or "MaxInstanceCount"), a "read restricted to application identifiers" parameter 512, a "write restricted to application identifiers" parameter 514, an "administration restricted to user identifiers" parameter 516, a version 518, a "properties" set of parameters 520, including a property name 522, a property first use date 524, an inferred type parameter set 526, an enforcement parameter 528, a "nullable" parameter 530, an "indexed" parameter 532, and a conversion instructions parameter set 534 (e.g. for converting older version data to latest schema as needed). It will be appreciated that a wide variety of inferred schema definitions may be conceived, and that the inferred schema definition 500 is merely representative of one possible embodiment in accordance with the present disclosure.

FIG. 6 shows an embodiment of a property inference algorithm 600. In this embodiment, the property inference algorithm 600 includes an "if JSON string" portion 610, an "if JSON object" portion 620, an "if JSON array" portion 630, an "if JSON primitive value" portion 640, a property value comparison portion 650, and a property name check portion 660. It will be appreciated that a wide variety of property inference algorithms may be conceived, and that the property inference algorithm 600 is merely representative of one possible embodiment in accordance with the present disclosure. For example, in alternate implementations, a property inference algorithm may perform operations on data units other than JSON blobs, such as blocks, packets, or other suitable data units. Furthermore, in alternate implementations, a property inference algorithm may perform checks on other types of data, such as strings (e.g. string length, etc.), Boolean values, or other suitable types. Further, in alternate implementations, a property inference algorithm may have greater or less restriction on allowable property names (at 660), data units (e.g. at 620, 630), or may perform additional analyses of the incoming data in comparison with the representative property inference algorithm 600.

It will be appreciated that techniques and technologies for dynamic schema determination and enforcement in accordance with the present disclosure may provide considerable advantages over convention systems. For example, in at least some implementations, because the techniques and technologies in accordance with the present disclosure allow for "on the fly" determination and enforcement of schema, such techniques and technologies may advantageously reduce or mitigate problems associated with conventional systems wherein incoming data may be stored in a data storage facility inconsistently or non-uniformly. Because techniques and technologies in accordance with the present disclosure monitor and prevent data inconsistencies, or alternately, properly account for data inconsistencies, data storage is improved and optimized over conventional systems. Moreover, by generating and maintaining data statistics during storage of incoming data, techniques and technologies in accordance with the present disclosure may greatly reduce computational burdens (i.e. processing cycles, memory usage, energy consumption, etc.) that would be associated with analysis and revision (or conversion) of previously stored data that would otherwise be required by conventional systems Thus, techniques and technologies in accordance with the present disclosure may advantageously improve the efficiency and operability of a computing system in terms of fewer processing cycles and reduced power consumption in comparison with conventional systems.

In general, techniques and technologies disclosed herein for a dynamic schema determination and enforcement may be described in the general context of computer code or machine-useable instructions, including computer-executable instructions such as program modules, being executed by a computer or other device. Generally, program modules including routines, programs, objects, components, data structures, etc., refer to code that perform particular tasks or implement particular abstract data types. Various embodiments of the invention may be practiced in a variety of system configurations, including hand-held devices, consumer electronics, general-purpose computers, more specialty computing devices, etc. In addition, various embodiments of the invention may also be practiced in distributed computing environments (e.g. cloud-based computing systems) where tasks are performed by remote-processing devices that are linked through a communications network.

Figure 7:
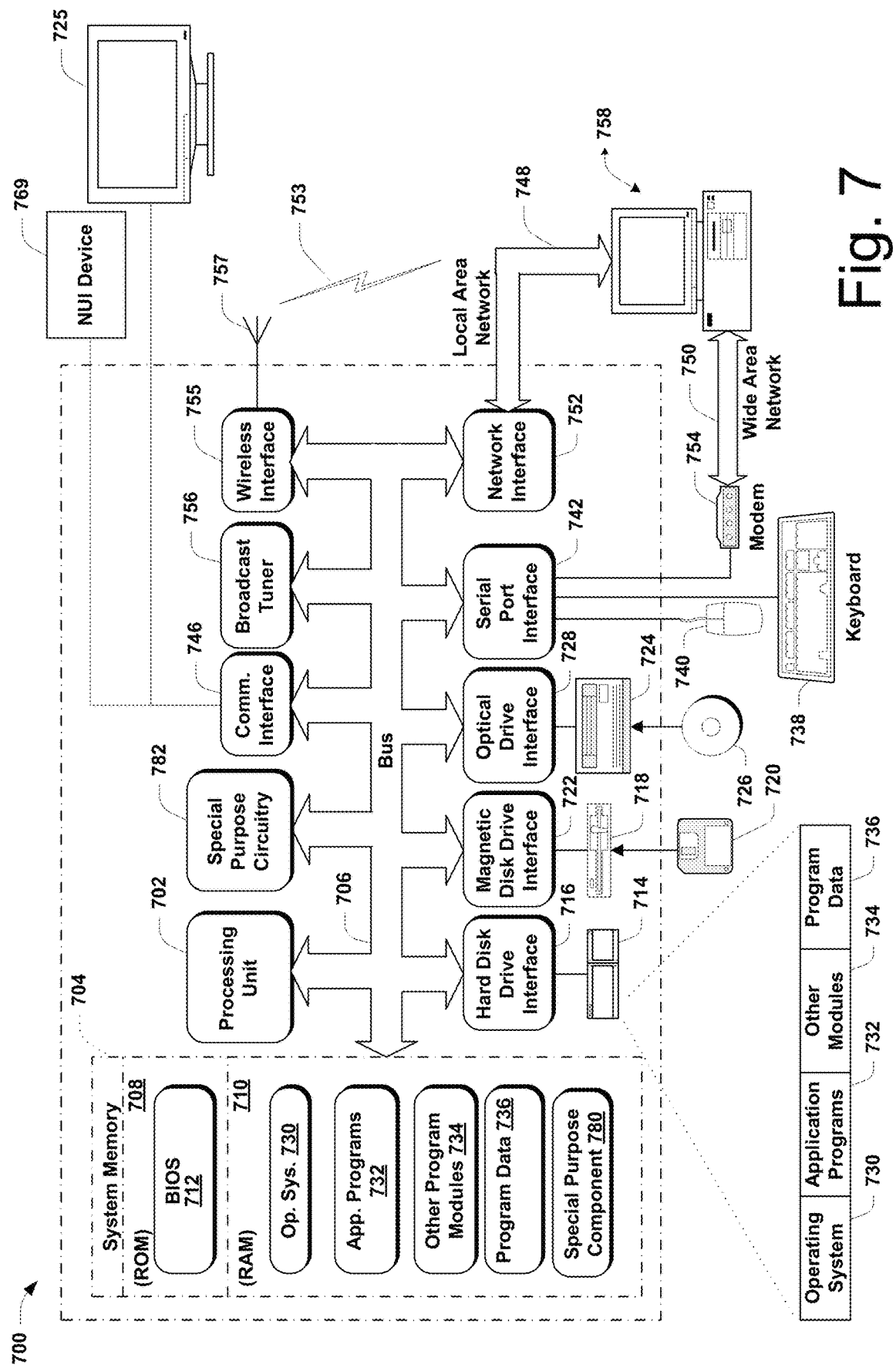
FIG. 7 shows an embodiment of a computing device environment for dynamic schema inference and enforcement.

Furthermore, techniques and technologies disclosed herein for dynamic schema determination and enforcement may be implemented on a wide variety of devices and platforms. For example, FIG. 7 shows an embodiment of a computer system 700 that may be employed for implementing dynamic schema determination and enforcement in accordance with the present disclosure. As shown in FIG. 7, the example computer system environment 700 includes one or more processors (or processing units) 702, special purpose circuitry 782, memory 704, and a bus 706 that operatively couples various system components, including the memory 704, to the one or more processors 702 and special purpose circuitry 782 (e.g., Application Specific Integrated Circuitry (ASIC), Field Programmable Gate Array (FPGA), etc.).

The bus 706 may represent one or more of any of several types of bus structures, including a memory bus or memory controller, a peripheral bus, an accelerated graphics port, and a processor or local bus using any of a variety of bus architectures. In at least some implementations, the memory 704 includes read only memory (ROM) 708 and random access memory (RAM) 710. A basic input/output system (BIOS) 712, containing the basic routines that help to transfer information between elements within the system 700, such as during start-up, is stored in ROM 708.

The example system environment 700 further includes a hard disk drive 714 for reading from and writing to a hard disk (not shown), and is connected to the bus 706 via a hard disk driver interface 716 (e.g., a SCSI, ATA, or other type of interface). A magnetic disk drive 718 for reading from and writing to a removable magnetic disk 720, is connected to the system bus 706 via a magnetic disk drive interface 722. Similarly, an optical disk drive 724 for reading from or writing to a removable optical disk 726 such as a CD ROM, DVD, or other optical media, connected to the bus 706 via an optical drive interface 728. The drives and their associated computer-readable media may provide nonvolatile storage of computer readable instructions, data structures, program modules and other data for the system environment 700. Although the system environment 700 described herein employs a hard disk, a removable magnetic disk 720 and a removable optical disk 726, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used.

The computer-readable media included in the system memory 700 can be any available or suitable media, including volatile and nonvolatile media, and removable and non-removable media, and may be implemented in any method or technology suitable for storage of information such as computer-readable instructions, data structures, program modules, or other data. More specifically, suitable computer-readable media may include random access memory (RAM), read only memory (ROM), electrically erasable programmable ROM (EEPROM), flash memory or other memory technology, compact disk ROM (CD-ROM), digital versatile disks (DVD) or other optical disk storage, magnetic cassettes, magnetic tape, magnetic disk storage or other magnetic storage devices, or any other medium, including paper, punch cards and the like, which can be used to store the desired information. As used herein, the term "computer-readable media" is not intended to include transitory signals.

As further shown in FIG. 7, a number of program modules may be stored on the memory 704 (e.g., the ROM 708 or the RAM 710) including an operating system 730, one or more application programs 732, other program modules 734, and program data 736 (e.g., image data, audio data, three dimensional object models, etc.). Alternately, these program modules may be stored on other computer-readable media, including the hard disk, the magnetic disk 720, or the optical disk 726. For purposes of illustration, programs and other executable program components, such as the operating system 730, are illustrated in FIG. 7 as discrete blocks, although it is recognized that such programs and components reside at various times in different storage components of the system environment 700, and may be executed by the processor(s) 702 or the special purpose circuitry 782 of the system environment 700.

A user may enter commands and information into the system environment 700 through input devices such as a keyboard 738 and a pointing device 740. Other input devices (not shown) may include a microphone, joystick, game pad, satellite dish, scanner, or the like. Still other input devices, such as a Natural User Interface (NUI) device 769, or user interface 725, include or involve one or more aspects of a Natural User Interface (NUI) that enables a user to interact with the system environment 700 in a "natural" manner, free from artificial constraints imposed by conventional input devices such as mice, keyboards, remote controls, and the like. For example, in at least some embodiments, the NUI device 769 may rely on speech recognition, touch and stylus recognition, one or more biometric inputs, gesture recognition both on screen and adjacent to the screen, air gestures (e.g. hand movement, wave, point, snap, nod, finger gesture, etc.), head and eye (or gaze) tracking, voice and speech, vision, touch, hover (e.g. maintaining position of finger or stylus proximate to a relevant portion of an interface or other location for a specified period, etc.), facial or body gestures, machine intelligence (e.g. pattern recognition, Bayesian learning algorithms, inductive learning algorithms, inference algorithms, etc.), as well as technologies for sensing brain activity using electric field sensing electrodes (EEG and related methods) to receive inputs. In addition, in at least some embodiments, an NUI may involve or incorporate one or more aspects of touch sensitive displays, voice and speech recognition, intention and goal understanding, motion gesture detection using depth cameras (such as stereoscopic or time-of-flight camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface.

These and other input devices are connected to the processing unit 702 and special purpose circuitry 782 through an interface 742 or a communication interface 746 (e.g. video adapter) that is coupled to the system bus 706. A user interface 725 (e.g., display, monitor, or any other user interface device) may be connected to the bus 706 via an interface, such as a video adapter 746. In addition, the system environment 700 may also include other peripheral output devices (not shown) such as speakers and printers.

The system environment 700 may operate in a networked environment using logical connections to one or more remote computers (or servers) 758. Such remote computers (or servers) 758 may be a personal computer, a server, a router, a network PC, a peer device or other common network node. The logical connections depicted in FIG. 7 include one or more of a local area network (LAN) 748 and a wide area network (WAN) 750. Such networking environments are commonplace in offices, enterprise-wide computer networks, intranets, and the Internet. In this embodiment, the system environment 700 also includes one or more broadcast tuners 756. The broadcast tuner 756 may receive broadcast signals directly (e.g., analog or digital cable transmissions fed directly into the tuner 756) or via a reception device (e.g., via an antenna 757, a satellite dish, etc.).

When used in a LAN networking environment, the system environment 700 may be connected to the local area network 748 through a network interface (or adapter) 752. When used in a WAN networking environment, the system environment 700 typically includes a modem 754 or other means (e.g., router) for establishing communications over the wide area network 750, such as the Internet. The modem 754, which may be internal or external, may be connected to the bus 706 via the serial port interface 742. Similarly, the system environment 700 may exchange (send or receive) wireless signals 753 with one or more remote devices using a wireless interface 755 coupled to a wireless communicator 757 (e.g., an antenna, a satellite dish, a transmitter, a receiver, a transceiver, a photoreceptor, a photodiode, an emitter, a receptor, etc.).

In a networked environment, program modules depicted relative to the system environment 700, or portions thereof, may be stored in the memory 704, or in a remote memory storage device. More specifically, as further shown in FIG. 7, a special purpose component 780 may be stored in the memory 704 of the system environment 700. The special purpose component 780 may be implemented using software, hardware, firmware, or any suitable combination thereof. In cooperation with the other components of the system environment 700, such as the processing unit 702 or the special purpose circuitry 782, the special purpose component 780 may be operable to perform one or more implementations of techniques and technologies described above (e.g., FIGS. 1-6).

Generally, application programs and program modules executed on the system environment 700 may include routines, programs, objects, components, data structures, etc., for performing particular tasks or implementing particular abstract data types. These program modules and the like may be executed as native code or may be downloaded and executed, such as in a virtual machine or other just-in-time compilation execution environments. Typically, the functionality of the program modules may be combined or distributed as desired in various implementations.

In view of the disclosure of techniques and technologies for dynamic schema determination and enforcement as disclosed herein, a few representative embodiments are summarized below. It should be appreciated that the representative embodiments described herein are not intended to be exhaustive of all possible embodiments, and that additional embodiments may be readily conceived from the disclosure of techniques and technologies provided herein.

For example, in at least some implementations, a data storage system, comprises: a processing component operatively coupled to a memory; a schema determination and enforcement component at least partially stored on the memory, the schema determination and enforcement component including one or more instructions executable by the processing component configured to perform one or more operations including at least: receiving a first data unit; analyzing the first data unit to determine an inferred data schema; receiving a second data unit; analyzing the second data unit to determine whether the second incoming data unit complies with the inferred data schema; if the second data unit complies with the inferred data schema, writing the second data unit to storage; and if the second data unit does not comply with the inferred data schema, at least one of:

modifying the inferred data schema based on the second data unit; or providing a notification of a non-compliance of the second data unit.

In at least some implementations, the first data unit includes a multi-property data unit, and wherein analyzing the first data unit to determine an inferred data schema comprises: applying a property inference algorithm to determine an inferred data schema associated with a plurality of properties of the multi-property data unit. In at least some other implementations, the first data unit includes a plurality of attribute-value pairs, and wherein analyzing the first data unit to determine an inferred data schema comprises: applying a property inference algorithm to determine an inferred data schema associated with the plurality of attribute-value pairs.

In at least some alternate implementations, analyzing the second data unit to determine whether the second incoming data unit complies with the inferred data schema comprises: analyzing the second data unit to determine whether all required properties have been specified. In some further implementations, analyzing the second data unit to determine whether the second incoming data unit complies with the inferred data schema comprises: detecting that the second data unit includes a new property that is not previously defined in the inferred data schema; and modifying the inferred data schema to accommodate the new property.

Further, in at least some implementations, analyzing the first data unit to determine an inferred data schema comprises: determining whether a property of the first data unit includes a JavaScript Object Notation (JSON) string; and if the property of the first data unit includes a JSON string, if the property parses as a Uniform Resource Identifier (URI) value, treat as a URI type; if the property parses as a DateTime value in accordance with an International Organization for Standardization (ISO) standard, treat the property as a DateTime type; if the property parses as a Globally Unique Identifier (GUID) value, treat the property as a GUID type; and if the property is not to be treated as the URI type, the DateTime type, or the GUID type, treat the property as a string type.

In addition, in at least some implementations, analyzing the first data unit to determine an inferred data schema comprises: determining whether a property of the first data unit includes a JavaScript Object Notation (JSON) primitive value; and if the property of the first data unit includes a JSON primitive value, if the property includes at least one of "true" or "false," treat the property as a Boolean type; if the property includes at least "null," treat the property as a nullable unknown type; and if the property parses as a 64-bit signed integer (Int64), treat the property as an integer type.

In at least some alternate implementations, analyzing the first data unit to determine an inferred data schema comprises: comparing a property of the first data unit to one or more of a largest possible value of a byte (byte·Min/MaxValue), a largest possible value of a 16-bit integer (int16·Min/MaxValue), and a largest possible value of a 32-bit integer (int32Min/MaxValue); record a largest range that is insufficient for storing the data unit; if the property parses as an unsigned 64-bit integer (UInt64), treat the property as a UInt64 value; if the property parses as a double, treat the property as a double value; and if the property is not to be treated as the UInt64 value or the double value, return an error as an unsupported number.

In at least some further implementations, modifying the inferred data schema based on the second data unit comprises: modifying the inferred data schema based on the second data unit and storing the second data unit in accordance with a modified inferred data schema. And in some implementations, the analyzing the first data unit to determine an inferred data schema comprises: analyzing one or more properties of the first data unit to determine at least one of: an acceptability of a data type of the one or more properties; an acceptability of a data value of the one or more properties; an acceptability of a string value of the one or more properties; or an acceptability of a string length of the one or more properties.

In at least some implementations, a data storage system, comprises: circuitry configured for receiving a first data unit; circuitry configured for analyzing the first data unit to determine an inferred data schema; circuitry configured for receiving a second data unit; circuitry configured for analyzing the second data unit to determine whether the second incoming data unit complies with the inferred data schema; circuitry configured for writing the second data unit to storage if the second data unit complies with the inferred data schema; and circuitry configured for, if the second data unit does not comply with the inferred data schema, at least one of: modifying the inferred data schema based on the second data unit; or providing a notification of a non-compliance of the second data unit.

In addition, in at least some alternate implementations, wherein the first data unit includes a multi-property data unit, and wherein circuitry configured for analyzing the first data unit to determine an inferred data schema comprises: circuitry configured for applying a property inference algorithm to determine an inferred data schema associated with a plurality of properties of the multi-property data unit. Similarly, in at least some implementations, wherein the first data unit includes a plurality of attribute-value pairs, and wherein the circuitry configured for analyzing the first data unit to determine an inferred data schema comprises: circuitry configured for applying a property inference algorithm to determine an inferred data schema associated with the plurality of attribute-value pairs.

In at least some alternate implementations, circuitry configured for analyzing the second data unit to determine whether the second incoming data unit complies with the inferred data schema comprises: circuitry configured for detecting that the second data unit includes a new property that is not previously defined in the inferred data schema; and circuitry configured for modifying the inferred data schema to accommodate the new property. In at least some further implementations, circuitry configured for analyzing the first data unit to determine an inferred data schema comprises: circuitry configured for determining whether a property of the first data unit includes a JavaScript Object Notation (JSON) string; and circuitry configured for determining if the property of the first data unit includes a JSON string, determining if the property parses as a DateTime value in accordance with an International Organization for Standardization (ISO) standard, treat the property as a DateTime type; determining if the property parses as a dashed Globally Unique Identifier (GUID) without one or more braces, treat the property as a GUID type; and determining if the property is not to be treated as the DateTime type or the GUID type, treat the property as a string type.

In addition, in at least some implementations, a method for data storage at least partially implemented using one or more processing components, comprises: receiving an incoming data for storage on a storage device; analyzing the incoming data using at least one inference algorithm operating on the one or more processing components to determine an inferred data schema; receiving additional incoming data for storage on the storage device; analyzing the additional incoming data to determine whether the additional incoming data substantially complies with the inferred data schema; if the additional incoming data substantially complies with the inferred data schema, writing the additional incoming data to the storage device; and if the additional incoming data does not substantially comply with the inferred data schema, modifying the inferred data schema based on one or more detected differences between the additional incoming data and the inferred data schema.

In at least some alternate implementations, analyzing the incoming data using at least one inference algorithm operating on the one or more processing components to determine an inferred data schema comprises: analyzing one or more properties of the incoming data using at least one inference algorithm operating on the one or more processing components at least one of: an acceptability of a data type of the one or more properties; an acceptability of a data value of the one or more properties; an acceptability of a string value of the one or more properties; or an acceptability of a string length of the one or more properties.

In at least some additional implementations, analyzing the incoming data using at least one inference algorithm operating on the one or more processing components to determine an inferred data schema comprises: determining whether a property of the incoming data includes a JavaScript Object Notation (JSON) primitive value; and if the property of the incoming data includes a JSON primitive value, if the property includes at least one of "true" or "false," treat the property as a Boolean type; if the property includes at least "null," treat the property as a nullable unknown type; and if the property parses as a 64-bit signed integer (Int64), treat the property as an integer type.

In further implementations, analyzing the incoming data using at least one inference algorithm operating on the one or more processing components to determine an inferred data schema comprises: comparing a property of the incoming data to one or more of a largest possible value of a byte (byte·Min/MaxValue), a largest possible value of a 16-bit integer (int16·Min/MaxValue), and a largest possible value of a 32-bit integer (int32Min/MaxValue); if the property parses as an unsigned 64-bit integer (UInt64), treat the property as a UInt64 value; if the property parses as a double, treat the property as a double value; and if the property is not to be treated as the UInt64 value or the double value, throw as an unsupported number.

And in at least some other implementations, modifying the inferred data schema based on the second data unit comprises: modifying the inferred data schema based on the second data unit and storing the second data unit in accordance with a modified inferred data schema.

CONCLUSION

Those skilled in the art will recognize that some aspects of the embodiments disclosed herein can be implemented in standard integrated circuits, and also as one or more computer programs running on one or more computers, and also as one or more software programs running on one or more processors, and also as firmware, as well as virtually any combination thereof. It will be further understood that designing the circuitry and/or writing the code for the software and/or firmware could be accomplished by a person skilled in the art in light of the teachings and explanations of this disclosure.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. It will be appreciated that the embodiments of techniques and technologies described above are not exhaustive of all possible embodiments considered to be within the scope of the present disclosure, and that additional embodiments may be conceived based on the subject matter disclosed herein. For example, in alternate embodiments one or more elements or components of the techniques and technologies described above may be re-arranged, re-ordered, modified, or even omitted to provide additional embodiments that are still considered to be within the scope of the present disclosure.

Alternately, or in addition, the techniques and technologies described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-On-a-Chip systems (SOCs), Complex Programmable Logic Devices (CPLDs), etc. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Although the subject matter has been described in language specific to structural features and/or acts, it is to be understood that the subject matter defined in the appended claims is not necessarily limited to the specific features or acts described. Rather, the specific features and acts described above are disclosed as examples of implementing the claims and other equivalent features and acts are intended to be within the scope of the claims. The various embodiments and implementations described above are provided by way of illustration only and should not be construed as limiting various modifications and changes that may be made to the embodiments and implementations described above without departing from the spirit and scope of the disclosure.

What is claimed is:

1. A data storage system, comprising:
   a processor;
   a memory operatively coupled to the processor; and
   a schema determination and enforcement component at least partially stored on the memory, the schema determination and enforcement component including instructions executable by the processor to perform one or more operations including:
   receiving a first data unit;
   analyzing the first data unit to determine an inferred data schema;
   receiving a second data unit;
   analyzing the second data unit including parsing and analyzing all properties of the second data unit to determine whether the second data unit complies with the inferred data schema;
if the second data unit complies with the inferred data schema, writing the second data unit to storage; and
if the second data unit does not comply with the inferred data schema,
modifying the inferred data schema based on the second data unit to define a modified data schema based on the parsing and analyzing of all properties of the second data unit, and storing the second data unit and the modified data schema to storage,
wherein:
the inferred data schema includes a first version identifier and the modified data schema includes a second version identifier,
the modified data schema includes a conversion instructions parameter set for bringing the first data unit associated with the first version identifier into compliance with the modified data schema, and
analyzing the first data unit to determine the inferred data schema includes:
determining if the first data unit includes an indication of a schema with which the first data unit is anticipated to comply, the indication of the schema including a name for the schema, and
in response to determining that the first data unit includes the indication, searching a schema repository for a corresponding schema,
determining whether a property of the first data unit includes a JavaScript Object Notation (JSON) string; and
if the property of the first data unit includes the JSON string, then:
if the property parses as a Uniform Resource Identifier (URI), treating the property as a URI type;
if the property parses as a DateTime value in accordance with an International Organization for Standardization (ISO) standard, treating the property as a DateTime type; and
if the property parses as a Globally Unique Identifier (GUID) value, treating the property as a GUID type.

2. The system of claim 1, wherein the first data unit includes a multi-property data unit, and wherein analyzing the first data unit to determine an inferred data schema comprises:
applying a property inference algorithm to determine an inferred data schema associated with a plurality of properties of the multi-property data unit.

3. The system of claim 1, wherein the first data unit includes a plurality of attribute-value pairs, and wherein analyzing the first data unit to determine an inferred data schema comprises:
applying a property inference algorithm to determine an inferred data schema associated with the plurality of attribute-value pairs.

4. The system of claim 1, wherein analyzing the second data unit including parsing and analyzing all properties of the second data unit to determine whether the second data unit complies with the inferred data schema comprises:
analyzing the second data unit including parsing and analyzing all properties of the second data unit to determine whether all required properties have been specified.

5. The system of claim 1, wherein analyzing the second data unit including parsing and analyzing all properties of the second data unit to determine whether the second data unit complies with the inferred data schema comprises:
detecting that the second data unit includes a new property that was not previously defined in the inferred data schema; and
modifying the inferred data schema to accommodate the new property.

6. The system of claim 1, wherein analyzing the first data unit to determine the inferred data schema comprises:
if the property of the first data unit includes the JSON string, and
if the property is not to be treated as the DateTime type or the GUID type, treating the property as a string type.

7. The system of claim 1, wherein analyzing the first data unit to determine the inferred data schema comprises:
determining whether the property of the first data unit includes a JavaScript Object Notation (JSON) primitive value; and
if the property of the first data unit includes the JSON primitive value, then:
if the property includes at least one of "true" or "false," treating the property as a Boolean type;
if the property includes at least "null," treating the property as a nullable unknown type; and
if the property parses as a 64-bit signed integer (Int64), treating the property as an integer type.

8. The system of claim 1, wherein analyzing the first data unit to determine the inferred data schema comprises:
comparing the property of the first data unit to one or more of a largest possible value of a byte (byte·Min/MaxValue), a largest possible value of a 16-bit integer (int16·Min/MaxValue), and a largest possible value of a 32-bit integer (int32Min/MaxValue);
recording a largest range that is insufficient for storing the first data unit;
if the property parses as an unsigned 64-bit integer (UInt64), treating the property as a UInt64 value;
if the property parses as a double, treating the property as a double value; and
if the property is not to be treated as the UInt64 value or the double value, returning an error as an unsupported number.

9. The system of claim 1, wherein modifying the inferred data schema based on the second data unit to define the modified data schema based on the parsing and analyzing of all properties of the second data unit comprises:
determining one or more conversion operations that can be applied to the first data unit to convert the first data unit from the inferred data schema to the modified data schema and including the one or more conversion operations in the modified data schema for conversion of at least the first data unit.

10. The system of claim 1, wherein analyzing the first data unit to determine the inferred data schema comprises:
analyzing one or more other properties of the first data unit to determine at least one of:
an acceptability of a data type of the one or more other properties;
an acceptability of a data value of the one or more other properties;
an acceptability of a string value of the one or more other properties; or
an acceptability of a string length of the one or more other properties.

11. The system of claim 1, wherein the name for the schema is provided by a user.

12. A data storage system, comprising:
circuitry configured for receiving a first data unit;
circuitry configured for analyzing the first data unit to determine an inferred data schema;
circuitry configured for receiving a second data unit;
circuitry configured for analyzing the second data unit including parsing and analyzing all properties of the second data unit to determine whether the second data unit complies with the inferred data schema;
circuitry configured for writing the second data unit to storage if the second data unit complies with the inferred data schema; and
circuitry configured for, if the second data unit does not comply with the inferred data schema, modifying the inferred data schema based on the second data unit to define a modified data schema based on the parsing and analyzing of all properties of the second data unit, and storing the second data unit and the modified data schema to storage,
wherein:
the inferred data schema includes a first version identifier and the modified data schema includes a second version identifier,
the modified data schema includes a conversion instructions parameter set for bringing the first data unit associated with the first version identifier into compliance with the modified data schema, and
analyzing the first data unit to determine the inferred data schema includes:
determining if the first data unit includes an indication of a schema with which the first data unit is anticipated to comply, the indication of the schema including a name for the schema, and
in response to determining that the first data unit includes the indication, searching a schema repository for a corresponding schema,
determining whether a property of the first data unit includes a JavaScript Object Notation (JSON) string; and
if the property of the first data unit includes the JSON string, then:
if the property parses as a Uniform Resource Identifier (URI), treating the property as a URI type;
if the property parses as a DateTime value in accordance with an International Organization for Standardization (ISO) standard, treating the property as a DateTime type; and
if the property parses as a Globally Unique Identifier (GUID) value, treating the property as a GUID type.

13. The system of claim 12, wherein modifying the inferred data schema based on the second data unit to define a modified data schema based on the parsing and analyzing of all properties of the second data unit comprises:
determining one or more conversion operations that can be applied to the first data unit to convert the first data unit from the inferred data schema to the modified data schema and including the one or more conversion operations in the modified data schema for conversion of the first data unit.

14. The system of claim 12, wherein the first data unit includes a plurality of attribute-value pairs, and wherein the circuitry configured for analyzing the first data unit to determine the inferred data schema comprises:
circuitry configured for applying a property inference algorithm to determine the inferred data schema associated with the plurality of attribute-value pairs.

15. The system of claim 12, wherein circuitry configured for analyzing the second data unit including parsing and analyzing all properties of the second data unit to determine whether the second data unit complies with the inferred data schema comprises:
circuitry configured for detecting that the second data unit includes a new property that was not previously defined in the inferred data schema; and
circuitry configured for modifying the inferred data schema to accommodate the new property.

16. The system of claim 12, wherein circuitry configured for analyzing the first data unit to determine the inferred data schema comprises:
circuitry configured for determining whether the property of the first data unit includes a JavaScript Object Notation (JSON) string; and
if the property of the first data unit includes the JSON string, then circuitry configured for analyzing the first data unit to determine the inferred data schema comprises circuitry configured for
if the property is not to be treated as the DateTime type or the GUID type, treating the property as a string type.

17. A method for data storage at least partially implemented using one or more processing components, comprising:
receiving an incoming data for storage on a storage device;
analyzing the incoming data using at least one inference algorithm operating on the one or more processing components to determine an inferred data schema;
receiving additional incoming data for storage on the storage device;
analyzing the additional incoming data including parsing and analyzing all properties of the additional incoming data to determine whether the additional incoming data substantially complies with the inferred data schema;
if the additional incoming data substantially complies with the inferred data schema, writing the additional incoming data to the storage device; and
if the additional incoming data does not substantially comply with the inferred data schema, modifying the inferred data schema based on one or more detected differences between the additional incoming data and the inferred data schema to define a modified data schema based on the parsing and analyzing of all properties of the additional incoming data, and storing the additional incoming data and the modified data schema to storage,
wherein:
the inferred data schema includes a first version identifier and the modified data schema includes a second version identifier,
the modified data schema includes a conversion instructions parameter set for bringing the incoming data associated with the first version identifier into compliance with the modified data schema, and
analyzing the incoming data to determine the inferred data schema includes:
determining if the incoming data includes an indication of a schema with which the incoming data is anticipated to comply, the indication of the schema including a name for the schema, and in response to determining that the incoming data includes the indication, searching a schema repository for a corresponding schema, determining whether a property of the incoming data includes a JavaScript Object Notation (JSON) string; and if the property of the incoming data includes the JSON string, then:

if the property parses as a Uniform Resource Identifier (URI), treating the property as a URI type;

if the property parses as a DateTime value in accordance with an International Organization for Standardization (ISO) standard, treating the property as a DateTime type; and if the property parses as a Globally Unique Identifier (GUID) value, treating the property as a GUID type.

18. The method of claim 17, wherein analyzing the incoming data using at least one inference algorithm operating on the one or more processing components to determine the inferred data schema comprises:

analyzing one or more other properties of the incoming data including at least one of:

an acceptability of a data type of the one or more other properties;

an acceptability of a data value of the one or more other properties;

an acceptability of a string value of the one or more other properties; or an acceptability of a string length of the one or more other properties.

19. The method of claim 17, wherein analyzing the incoming data using at least one inference algorithm operating on the one or more processing components to determine the inferred data schema comprises:

determining whether the property of the incoming data includes a JavaScript Object Notation (JSON) primitive value; and if the property of the incoming data includes the JSON primitive value, then:

if the property includes at least one of "true" or "false," treating the property as a Boolean type;

if the property includes at least "null," treating the property as a nullable unknown type; and if the property parses as a 64-bit signed integer (Int64), treating the property as an integer type.

20. The method of claim 17, wherein analyzing the incoming data using at least one inference algorithm operating on the one or more processing components to determine the inferred data schema comprises:

comparing a property of the incoming data to one or more of a largest possible value of a byte (byte·Min/MaxValue), a largest possible value of a 16-bit integer (int16·Min/MaxValue), and a largest possible value of a 32-bit integer (int32Min/MaxValue);

if the property parses as an unsigned 64-bit integer (UInt64), treating the property as a UInt64 value;

if the property parses as a double, treating the property as a double value; and if the property is not to be treated as the UInt64 value or the double value, returning an error as an unsupported number.

21. The method of claim 17, wherein modifying the inferred data schema based on one or more detected differences between the additional incoming data and the inferred data schema to define the modified data schema based on the parsing and analyzing of all properties of the additional incoming data comprises:

determining one or more conversion operations that can be applied to the incoming data to convert the incoming data from the inferred data schema to the modified data schema and including the one or more conversion operations in the modified data schema for conversion of at least the incoming data.

* * * * *